May 7, 1963  L. E. NOTTINGHAM  3,088,676
ORCHARD SPRAYER
Filed Feb. 23, 1961  6 Sheets-Sheet 1
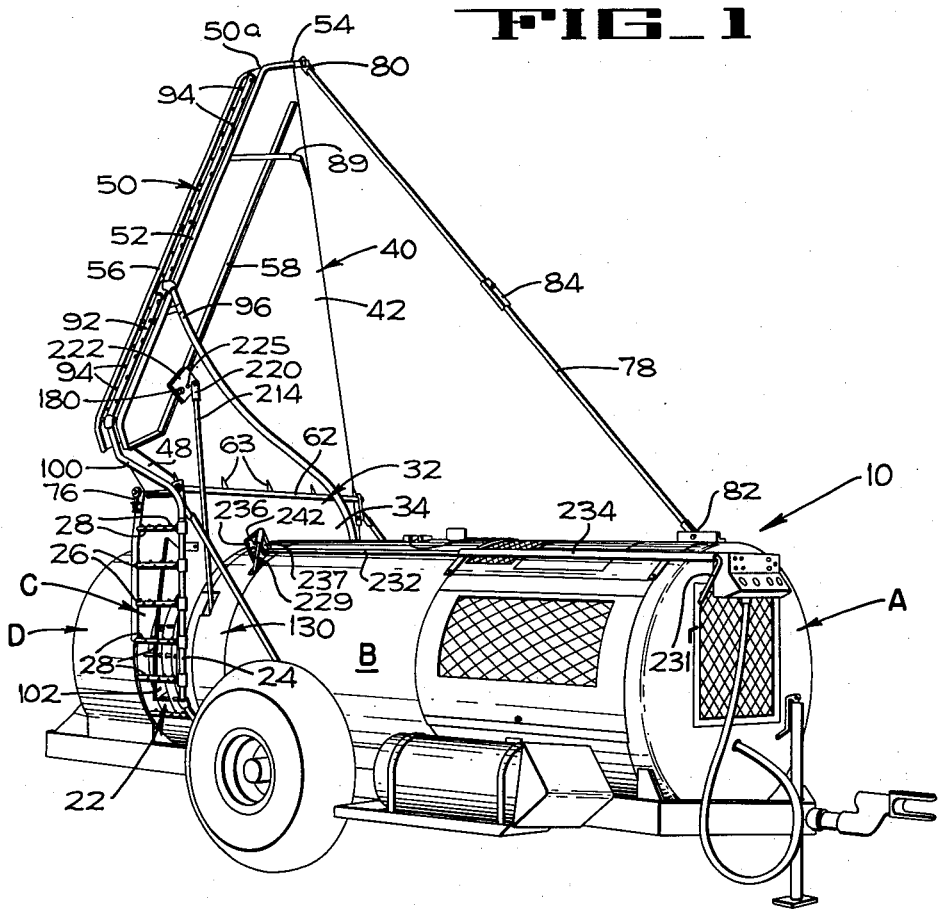
FIG_1
INVENTOR
LEWIS E. NOTTINGHAM
BY
ATTORNEY May 7, 1963   L. E. NOTTINGHAM   3,088,676
ORCHARD SPRAYER
Filed Feb. 23, 1961   6 Sheets-Sheet 2
FIG_2
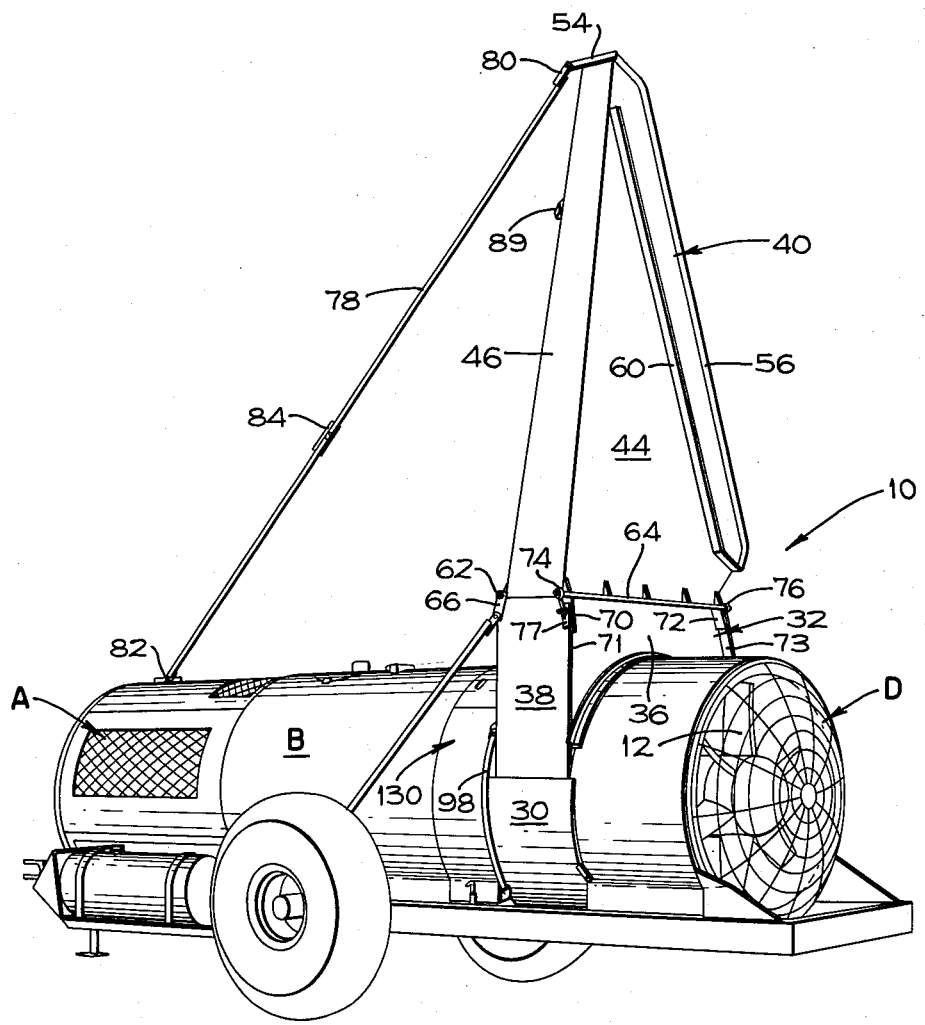
INVENTOR
LEWIS E. NOTTINGHAM
BY Hans G. Hoffmeister
ATTORNEY May 7, 1963 L. E. NOTTINGHAM 3,088,676
ORCHARD SPRAYER
Filed Feb. 23, 1961 6 Sheets-Sheet 3
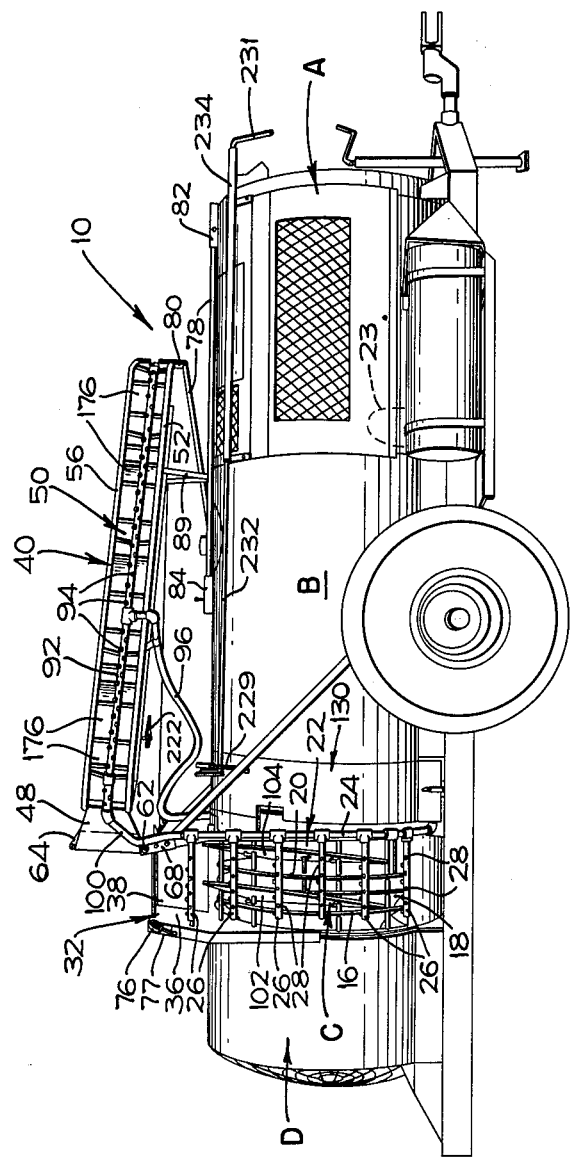
FIG_3
INVENTOR
LEWIS E. NOTTINGHAM
BY
ATTORNEY

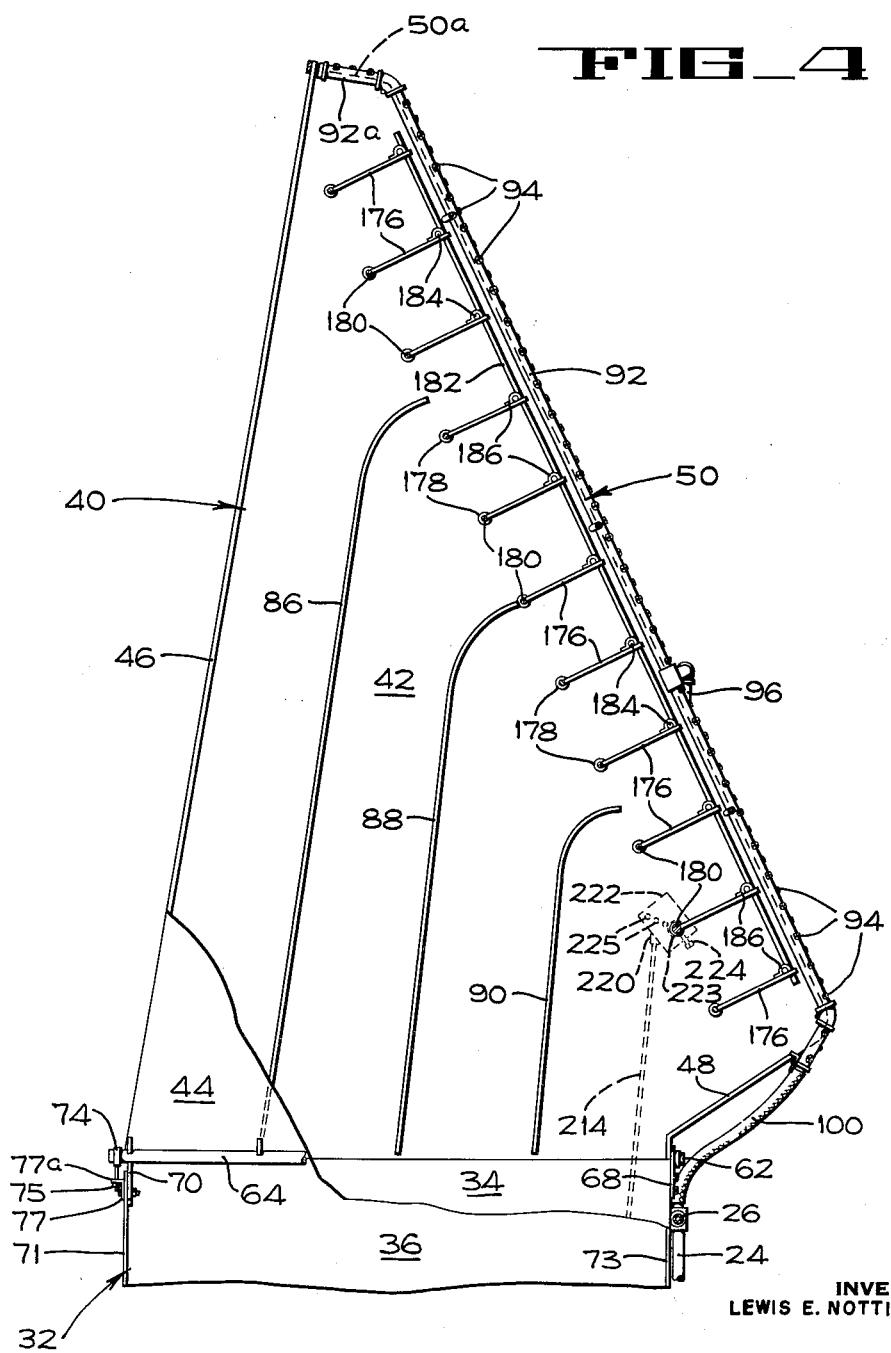

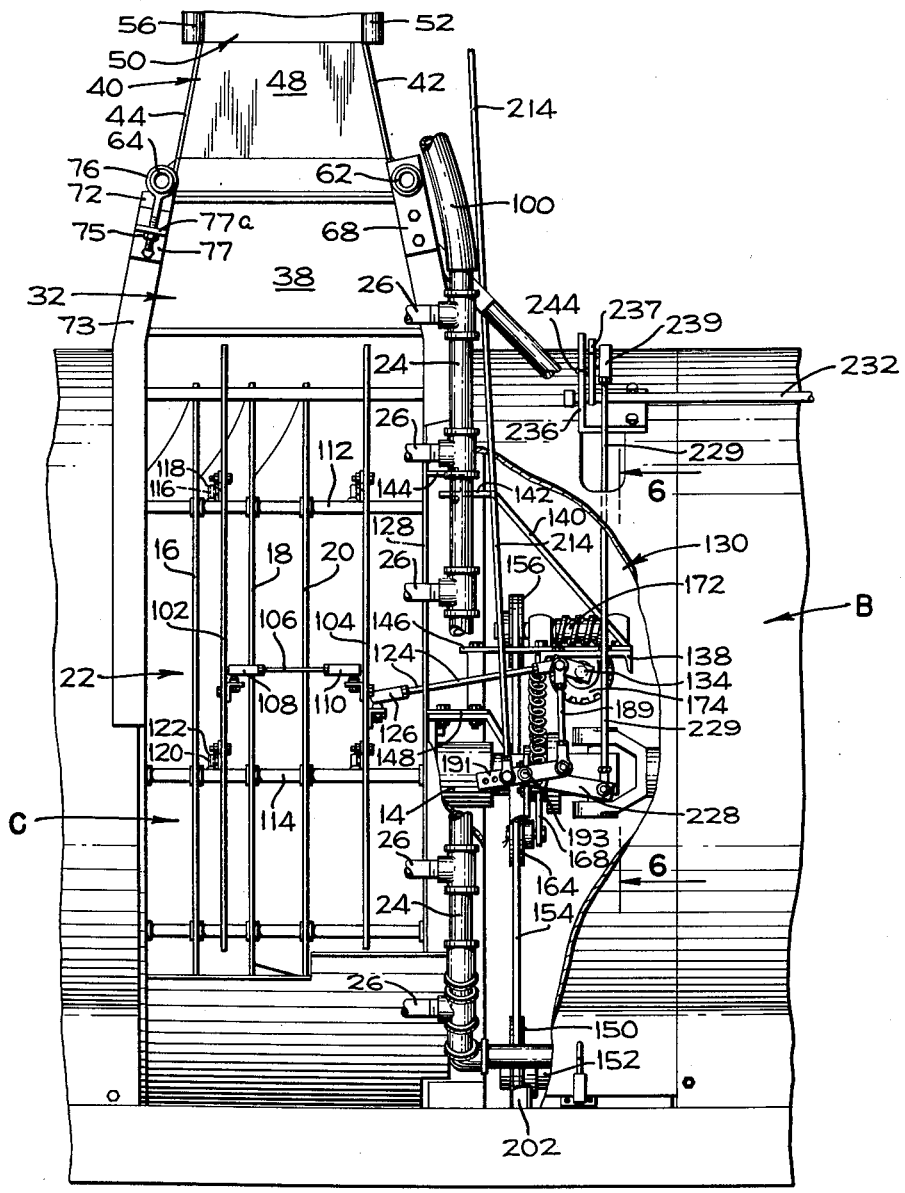
FIG_5

May 7, 1963 L. E. NOTTINGHAM 3,088,676
ORCHARD SPRAYER
Filed Feb. 23, 1961 6 Sheets-Sheet 6
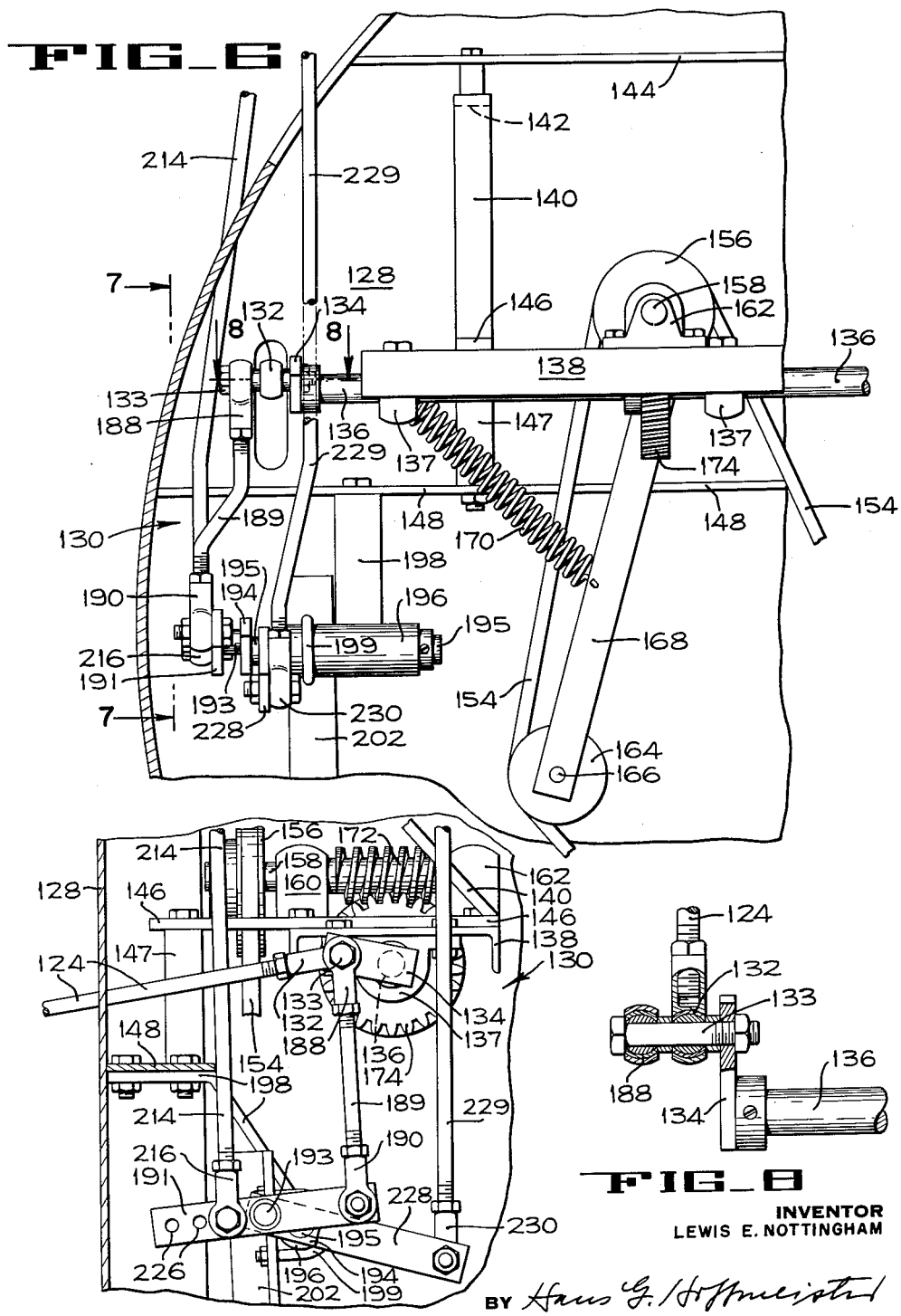
INVENTOR
LEWIS E. NOTTINGHAM
BY Hans G. Hoffmeister
ATTORNEY United States Patent Office 3,088,676
Patented May 7, 1963

3,088,676
ORCHARD SPRAYER
Lewis E. Nottingham, Orlando, Fla., assignor to FMC Corporation, a corporation of Delaware
Filed Feb. 23, 1961, Ser. No. 91,015
9 Claims. (Cl. 239—78)

This invention pertains to orchard sprayers and more particularly relates to an improved device for forming and concentrating the air stream of a sprayer to obtain more effective distribution of the spray pattern.

In the spraying of trees having relatively dense upper foliage which is disposed a considerable distance from the ground, it is extremely difficult to obtain proper spray penetration of such foliage. It is therefore an object of the present invention to provide an improved device for forming and concentrating the air stream of an orchard sprayer to aid the spray penetration of such dense foliage.

Another object of the present invention is to provide an improved mechanism for use with an orchard sprayer to oscillate the air blast at the upper portion of the spray pattern and to increase its velocity to cause the higher limbs of the tree to whip and thus facilitate the spray penetration of the foliage.

Another object of this invention is to provide an attachment for an orchard sprayer to aid the spray penetration of dense foliage.

Another object of this invention is to provide an attachment for an orchard sprayer which may be readily lowered to reduce the overhead clearance required when transporting and storing the sprayer.

These and other objects and advantages of the present invention will become apparent from the following description and accompanying drawings in which:

FIG. 1 is a perspective looking from the front toward the rear on the right-hand side of an orchard sprayer incorporating the apparatus of the present invention. Hereinafter, the term right-hand side will refer to the side of the machine that is forwardly and to the right of a person standing at the rear or blower end of the machine and looking forward toward the front end of the machine to which the towing hitch is connected.

FIG. 2 is a perspective looking from the rear toward the front on the left-hand side of the sprayer illustrated in FIG. 1.

FIG. 3 is a perspective of the right-hand side of the machine with the spray tower disposed in a lowered transporting position.

FIG. 4 is an enlarged fragmentary rear elevation of the machine, with parts broken away and parts shown in section.

FIG. 5 is an enlarged fragmentary side elevation of the right-hand side of the machine with parts broken away to illustrate its internal operating mechanism.

FIG. 6 is an enlarged fragmentary section taken on line 6—6 of FIG. 5.

FIG. 7 is an elevation looking in the direction of arrows 7—7 of FIG. 6, particularly showing the vane control linkage.

FIG. 8 is an enlarged section taken on line 8—8 of FIG. 6.

The spraying machine of the present invention is a modification of the machine disclosed in the application of Meadowcroft, Serial No. 762,504, now Patent No. 3,009,644, dated November 21, 1961. Certain mechanisms are common to both machines. Accordingly, for a more specific disclosure of any of these common parts reference may be had to the Meadowcroft application.

The sprayer 10 (FIG. 1) comprises an engine compartment A within which an engine (not shown) is mounted, a spray storage section B, an air discharge section C, and a blower section D. An impeller 12 (FIG. 2) is mounted at the rear of the blower section D and is rotated by the engine through a suitable drive mechanism, including a shaft 14 (FIG. 5), to draw air in through the open rear end of the blower section D and move it through the machine toward the air discharge section C. At section C, the air stream is directed radially outwardly by a plurality of bell shaped louvers 16, 18 and 20 (FIG. 5) of an air deflecting head 22.

Orchard sprayers of this type are usually adapted to discharge air radially outwardly from the bell shaped louvers in a fan-like pattern that extends radially outwardly on both sides of the machine. With this arrangement, ordinary spraying of rows of trees on each side of the path of travel of the vehicle may be accomplished. In accordance with the present invention, an improved device for forming and concentrating the air stream is provided whereby the radial discharge at the left side of the machine is eliminated and the air that would ordinarily be directed out at this zone is directed upwardly and inclined toward the right, at a considerable distance from the ground, to aid in penetrating the dense foliage at the upper portions of the trees. It will be evident, of course, that the usual radial air stream is still directed into the lower portion of these trees at the right side of the machine.

Spray liquid from the tank section D of the machine is pumped by a pump 23 (FIG. 3) into a spray manifold 24 (FIGS. 1 and 5) at the right side of the machine, and thence into a plurality of spray distribution pipes 26 which project laterally from the manifold 24 and extend transversely across the peripheral air blast opening on the right-hand side of the machine. Each of the spray distribution pipes 26 is provided with a plurality of spray nozzles 28 (FIG. 1) which direct insecticide or the like into the air blast issuing from the passages between the louvers 16, 18 and 20.

The air blast opening on the left side of the machine (FIG. 2) is closed by a sheet metal cover 30, whereby the air which would normally issue therefrom is directed upwardly through a conduit, defined by a rectangular housing 32, and issues from the upper end thereof. The housing 32 comprises a front wall 34 (FIG. 1), a rear wall 36 (FIG. 2), and a left side wall 38 which joins the sheet metal cover 30. The walls 34 and 36 have flanged lower edges attached, as by bolts (not shown), to the frame of the air deflecting head 22.

The air passing upwardly through the housing 32 issues into the lower end of a spray tower 40 which is fitted onto the top of the housing 32, the housing acting as an adapter member for mounting the tower on the generally cylindrical periphery of the air discharge section C of the machine. The tower 40 comprises a front wall 42, a rear wall 44 (FIG. 2), a left wall 46, and a right wall 48 (FIGS. 1, 3 and 4). The front, rear and side walls of the tower 40 converge from bottom to top to form an air blast outlet 50 (FIGS. 1, 3 and 4) which may be rectangular, as shown, and which has a major portion facing upwardly and outwardly from the right-hand side of the machine. A short outlet section 50a (FIG. 4) is disposed in an almost horizontal position. The rim of outlet 50 is reinforced by stiffener members 52, 54, and 56 (FIG. 1). Further reinforcement is provided for the front wall 42 by stiffener member 58 and for the rear wall 44, by stiffener member 60 (FIG. 2).

The tower 40 is pivotally mounted on the housing 32 by means of a tubular rod 62 (FIG. 1) that is secured, as by welding, to the lower edge of the forward wall 42 of the tower. A plurality of triangular support plates 63 are welded to the rod 62 and to the wall 42 to further secure the rod to the wall. The ends of the rod 62 extend laterally past the side edges of the walls 46 and 48, and each end projects through a tubular bushing disposed in hinge straps 66 and 68 (FIGS. 2 and 5) that are bolted to the upper and forward portions of the sides of housing 32, the bolted connection of strap 68 being particularly shown in FIG. 5. The bushings in straps 66 and 68 permit rotation of the rod 62 within the straps 66 and 68 and consequently permit the tower 40 to be pivoted from an upright position, as shown in FIG. 2, to a horizontal position, as shown in FIG. 3.

In its upright position, the tower is supported by the hinge straps 66 and 68 and by two support brackets 70 and 72 (FIGS. 2 and 5) that are welded to flanges 71 and 73, respectively, formed on the housing 32. The end portions of a rod 64, which is welded to the rear wall 44 of the tower, project past the side edges of the rear wall 44 and are adapted to rest on the upper surfaces of the brackets 70 and 72. If desired, the upper surfaces of the brackets may be provided with arcuate recesses to receive the rod ends.

The tower is locked in its upright position by means of two ring bolts 74 and 76 (FIGS. 4 and 5), the annular end of bolt 74 being adapted to be placed over one end of rod 64, and bolt 76 being adapted to receive the other end of the rod. As best seen in FIG. 5, each of the ring bolts is removably fitted over the associated end of the rod and is drawn down toward the bracket 70 or 72 by a nut 75 which underlies a flange 77a on an angle bracket 77 that is bolted to the adjacent flange 71 or 73.

The tower is also held in upright position by means of a support rod 78 (FIG. 2), that is connected by a hinge 80 to the top of tower 40, and by a hinge 82 to the forward end of the sprayer 10. The support rod is provided with a hinged latch 84 intermediate its ends which permits the rod to be rigidly latched in an extended position when the tower 40 is in erect position (FIG. 2) and to be folded when the tower is pivoted to the horizontal position (FIG. 3). A support bracket 89, which is connected to upper portion of tower 40, has an end portion adapted to rest on the top of the spray storage tank to support the tower when in horizontal position.

As the air blast moves upwardly in the tower 40, it is divided into substantially equal portions by fixed guide vanes 86, 88 and 90 (FIG. 4) that are mounted within the tower 40 between the front and rear walls. The uppermost end of each of these vanes is curved to aid in directing the blast laterally and upwardly past a spray manifold 92 (FIGS. 1 and 4) that is mounted in fixed position on the tower 40 adjacent and parallel to the tower outlet 50 and substantially centrally between the front and rear walls of the outlet as seen in FIG. 3. The manifold 92 is provided with a plurality of spray nozzles 94 (FIG. 4) adapted to spray the liquid into the air blast issuing from the outlet 50 on both sides of the manifold. The major portion of the manifold 92 is disposed at a steep vertical angle, as seen in FIG. 4. However, a short upper end portion 92a is diposed adjacent discharge opening 50a and is oriented closer to the horizontal so that air-borne spray material will be carried upwardly at an angle that is closer to the vertical than is the angle of the material discharged from the major portion of the manifold. The spray manifold 92 is connected by a flexible conduit 100 (FIG. 1) to the spray manifold 24 and, by means of a conduit 96, to a supply manifold 98 (FIG. 2) mounted on the left side of the machine, said supply manifold 98 being connected to the liquid circulating pump 23 of the machine.

Two oscillating vanes 102 and 104 (FIGS. 3 and 5) are mounted in the air discharge outlet at the right side of the machine to alternately shift the air blast back and forth in directions longitudinal of the vehicle. Two vanes 102 and 104 are connected by a connecting rod 106 (FIG. 5) having ball and socket joints 108 and 110 at its opposite ends. The ball and socket joint 108 is fixed to a bracket which in turn is fixed to the vane 102.

The joint 110 is similarly attached to a bracket fixed to the vane 104, whereby the vanes 102 and 104 are interconnected for conjoint movement.

The two vanes 102 and 104 are similarly shaped and both are pivotally mounted in the same manner. Therefore, only the vane 102 will be described in detail. Two rods 112 and 114 (FIG. 5) are fixed to the frame of the air deflecting head 22 and extend transversely across the air discharge opening. The vane 102 has an outer edge shaped to substantially conform to the outer edges of the vertical walls of the housing that define the spray discharge opening. The inner edge of the vane 102 is provided with a pair of slots (not shown) one of which is adapted to fit over each of the rods 112 and 114. A vertical pivot pin 116 is fixed to the rod 112 and is received within a tubular bushing 118 fixed to the vane 102. Similarly, a vertical pivot pin 120, which is coaxial with pin 116, is fixed to the rod 114 and is received within a tubular bushing 122 fixed to the vane 102. If necessary, the edge of the vane 102 may be provided with a plurality of cut out portions or slots to fit around the spray distribution pipes 26.

The mechanism for oscillating the vanes 102 and 104 about their pivotal axes comprises an operating rod 124 (FIG. 5) having one end connected by a ball and socket joint 126 to a bracket fixed to the vane 104. The rod 124 extends through an opening formed in a vertical wall 128 of the air deflection head 22, and the opposite end of the operating rod 124 is disposed within the compartment 130 and is connected by a ball and socket joint 132 to a bolt 133 (FIGS. 6–8). The bolt 133 is secured to a crank arm 134 which is fixed to and projects laterally from a transversely extending shaft 136.

The shaft 136 is rotatably mounted in suitable bearings 137 (FIGS. 6 and 7) fixed to an inverted channel bracket 138 which is bolted to the under surfaces of two rigid, generally V-shaped braces 140 (one only being shown).

One end 142 of each brace is bolted to a rigid flange 144 that projects from the wall 128. The other end 146 of each strap is secured by a bolt to a strap 147 that projects upwardly from a second stiffening flange 148 attached to the wall 128.

The drive mechanism for rotating the shaft 136 comprises a drive pulley 150 (FIG. 5) fixed to an auxiliary drive shaft 152 which is driven by the engine of the machine. A belt 154 connects the pulley 150 with a pulley 156 which is fixed to a shaft 158. Shaft 158 is rotatably mounted in suitable bearings 160 and 162 mounted on the channel bracket 138. A belt tightening idler pulley 164 engages the belt 154 and is rotatably mounted on a suitable stub shaft 166 fixed to one end of an arm 168 the other end of which is pivotally mounted to the channel bracket 138. A tension spring 170 is interconnected between the arm 168 and the bracket 138 to maintain the drive belt 154 under proper tension. A worm 172 is fixed to the shaft 158 and meshes with a worm gear 174 which is fixed to the shaft 136.

From the foregoing description it will be evident that, whenever the engine is operating, the shaft 136 is rotating to cause the vanes 102 and 104 to continuously oscillate the spray issuing from the right side of the machine in directions fore and aft of the machine.

A plurality of identical air blast directing vanes 176 (FIGS. 3 and 4) are mounted within the tower 40 adjacent the discharge outlet 50 to extend from the front wall 42 to the rear wall 44. Each of the vanes 176 is generally rectangular in form and is provided adjacent its inner edge with a pair of bushings 178, one adjacent each side edge thereof. A rod 180 extends through the bushings 178 of each vane and through suitable openings provided in the front and rear walls 42 and 44, respectively, of the tower 40. Each rod 180 is held in place by suitable means such as cotter keys which are disposed exteriorly of the tower in holes at the ends of the rod.

Each of the vanes 176 is mounted for pivoted movement about its associated pivot rod 180. The pivot rods 180 are equally spaced from each other and are disposed on a line parallel to the mouth of the outlet 50 and spaced therefrom a distance slightly greater than the width of the vanes 176 so that the outer free end of each vane will clear the spray distribution pipe 92. The free end of each of the vanes is provided with a notch adjacent its midportion to accommodate a tie bar 182 which carries a plurality of laterally projecting pivot pins 184 at equally spaced points along its length. The pins 184 are received within suitable bushings 186, one of which is fixed on each of the vanes 176 adjacent the notch. The tie bar 182 thus connects together the free ends of all the vanes 176 whereby the vanes are interconnected for conjoint pivotal movement, each about its own pivot rod 180.

The vanes 176 are oscillated about their respective pivot rods 180 by a mechanism comprising a ball and socket bearing member 188 (FIGS. 6–8) which is also mounted on the bolt 133 that is carried by the crank arm 134. A connecting rod 189 projects downwardly from member 188 and carries at its lower end a ball and socket bearing member 190 which is pivotally connected to a rocker bar 191. The rocker bar 191 is pivoted on a pin 193 that is carried by a crank 194 which is secured to a shaft 195 journalled in a bearing unit 196 (FIG. 6). The bearing unit is held in fixed position by means of a brace 198 and a clamp 199 that locks the bearing unit to an angle bar 202 of the machine frame.

The rocker bar 191 actuates a vane operating rod 214 (FIG. 7) which is provided at its lower end with a ball and socket joint 216 that is pivotally connected to the rocker bar 191. The upper end of the operating rod 214 (FIGS. 1 and 4) is provided with a ball and socket joint 220 which is pivotally secured to an oscillating plate 222 to which a hub 223 is secured. A capscrew 224 adjustably secures the hub 223 to an extension of one of the shafts 180 which pivotally mount the vanes 176. The ball and socket joints 216 and 220 are arranged to be readily disconnected so that the rod 214 may be removed in preparation for pivoting the tower 40 into horizontal position. The oscillating plate 222 is provided with a plurality of apertures 225 into which the ball joint 220 may be selectively connected to vary the amplitude of the oscillations of the vanes 176. If desired, the amplitude of the oscillations may also be varied by selectively securing the joint 216 (FIG. 7) in one of several holes 226 formed in the rocker arm 191.

In addition to the means for varying the amplitude of the oscillations, the present machine also has means for shifting the range of the oscillations. This shifting is accomplished by a lever 228 (FIG. 7) that is welded to the shaft 195 and is connected at its other end to an upwardly projecting operating rod 229 by a ball joint 230. When the rod 229 is raised, the shaft 195 is rotated counterclockwise (FIG. 7) causing the pivot pin 193 to be moved downwardly. This downward movement of the pin 198 causes downward movement of push rod 214 and, as a result, the initial position of the push rod 214, and the vanes connected thereto is changed.

The range of oscillations can be changed by the operator, by means of a lever 231 (FIG. 1) that is mounted on the machine at the front end thereof within reach of an operator sitting in the driver's seat of the towing vehicle. The lever 231 is formed on the forward end of a shaft 232 that is rotatably journalled in an elongate sleeve 234 secured to the housing of the engine compartment A. At its rearward end, the shaft 232 is journalled in an opening in a support plate 236 (FIG. 5) that is fixed to and projects upwardly from the housing of the sprayer. An arm 237 is welded or keyed to shaft 232 and is pivotally connected by a ball joint 239 to the operating rod 229. It is evident that rotation of the shaft 232 causes raising or lowering of the rod 229 with the resulting swinging of the lever 228 and shifting of the initial position of the vanes.

The upstanding plate 236 has a plurality of apertures 242 disposed in an arcuate pattern corresponding to the path of movement of a pin 244 that projects from the arm 237. When the operator wants to shift the range of the vanes, he first slides the shaft 232 forwardly to withdraw the pin 244 from the aperture in which it is disposed. Then he rotates the shaft to select the new position of the vanes and slides the shaft rearwardly to move pin 244 into the aperture corresponding to the selected range position. If desired, the rear end of the pin 244 may be provided with a fixed stop (not shown) which would abut the front side of the plate 236 and limit the amount that the pin could be inserted into a particular aperure, and a spring detent which would abut the rear side of the plate 236 and prevent the inadvertent shifting of the shaft while permitting longitudinal movement of the shaft by the operator.

When the machine is operating, and the lever 228 is in the position illustrated in FIG. 5, the crank 134 causes the rocker bar 191 to rock about its pivot 193. This movement is transmitted through the operating rod 214, to cause oscillation of the vanes.

If the operator desires to vary the upper limit of the spray pattern, he may slide the adjustment shaft 232 forward to release the pin 244 from the plate 236 and rotate the shaft so that the pin 244 may be received in a different hole in the plate.

From the foregoing description it will be appreciated that, when the machine is operating, a lateral spray air blast is continuously oscillated horizontally, and that the spray air blast from the tower outlet 50 is continuously oscillated vertically. The combined effect of these oscillations is to cause the limbs of the trees to whip and to facilitate the spray penetrations of the dense foliage thereon and achieve complete saturation. The height of the tower 40 and the increased velocity of the air blast therefrom, as provided by the tapering tower, greatly increases the whipping of the uppermost limbs of the trees and the spray penetration of the dense foliage thereon.

It is also to be appreciated that the tower not only provides improvement in the spraying of dense foliage of considerable height, but also permits transportation and storage of the sprayer under relatively low head clearances when pivoted into horizontal position. It will be understood that the tower for forming and concentrating the air stream of the present sprayer may be supplied as a part of the sprayer or may be supplied as an attachment which may be mounted on the sprayer when it is necessary to spray dense foliage at the top of the trees.

Having thus described my invention, what I claim and desire to secure by Letters Patent is:

1. A spraying machine comprising a generally cylindrical air discharge housing having a discharge opening in its upper periphery, upwardly projecting air conduit means disposed over said opening and arranged to receive air moving upwardly from said housing, means defining an elongate slanted air discharge passage in said conduit means including a first discharge portion extending upwardly from a lower side portion of said conduit means at an acute angle relative to the vertical and a second portion forming an upper continuation of said portion but disposed at an acute angle relative to the horizontal, said second portion being disposed above said housing a distance equal to approximately twice the diameter of said cylindrical housing, and means for forming an air blast in said housing and forcing it upwardly into said conduit means for discharge through said first and second discharge portions, the air leaving said second discharge portion being directed into the upper foliage of trees being sprayed while the air leaving said first discharge portion is directed generally laterally into the side foliage of the trees.

2. A spraying machine comprising a generally cylindrical air discharge housing having a side discharge opening at one side and an upper discharge opening in its upper periphery, means for forming an air blast and directing it through said housing and out said discharge openings, a mounting member disposed over said upper discharge opening, an elongate conduit pivotally mounted on said mounting member and arranged to direct air upwardly away from said upper discharge opening and outwardly through an elongate inclined discharge opening having an upper end spaced above said cylindrical housing at a distance equal to approximately twice the diameter of said opening, said elongate conduit being mounted for pivotal movement between a lowered position disposed close to and directly above a portion of said cylindrical housing to an elevated operating position, first guide vanes pivotally mounted for oscillating movement about substantially horizontal axes at the upper end of said conduit, second guide vanes pivotally mounted adjacent said side discharge opening of said housing for oscillating movement about a generally vertical axis, and means for simultaneously oscillating said first and second guide vanes whereby the foliage at the lower portion of plants being sprayed is waved sidewise and foliage at the upper portion of the plants is waved up and down.

3. A spraying machine comprising an elongate generally cylindrical body having a blower housing at the rear end and an engine compartment at the forward end, a tow connection at said forward end for a pulling vehicle, means for forming an air blast in said blower housing, means providing a discharge opening along a portion of the periphery of said blower housing, a rigid air guiding tower mounted on said body for pivoting about a horizontal axis and disposed over said discharge opening and arranged to direct air upwardly away from said housing, said tower having an elongated inclined discharge opening at an elevated position above said housing with the upper portion thereof extending a distance above said cylindrical body equal to approximately twice the diameter of said body, a plurality of guide vanes mounted for pivotal movement about substantially horizontal axes adjacent the discharge opening of said tower, means for directing liquid pesticide into the air passing through the discharge opening of said tower, means for oscillating said vanes, and linkage means operatively connected to said oscillating means for varying the oscillating range of said vanes, said linkage having a control member adjacent the forward end of the body for actuation by an operator on the towing vehicle.

4. A spraying machine comprising an elongate generally cylindrical body having a blower housing at the rear end and an engine compartment at the forward end, a tow connection at said forward end for a pulling vehicle, means for forming an air blast in said blower housing, means providing a discharge opening along a portion of the periphery of said blower housing, a rigid air guiding tower mounted on said body for pivoting about a horizontal axis and disposed over said discharge opening and arranged to direct air upwardly away from said housing, said tower having a discharge opening along one side thereof and extending to an elevated position above said housing, a plurality of guide vanes mounted for pivotal movement about substantially horizontal axes adjacent the discharge opening of said tower, means for directing liquid pesticide into the air passing through the discharge opening of said tower, means for oscillating said vanes, and means for varying the oscillation range of said vanes including a lever connected to said oscillating means, a push rod connected to said lever and projecting to a position adjacent a peripheral portion of said cylindrical body, a shaft rotatably and slidably mounted on said body and having an end portion adjacent said push rod, a selector arm keyed to said rotatable shaft and pivotally connected to said push rod whereby rotation of said shaft causes actuation of said push rod and pivoting of said lever, a selector pin projecting from said selector arm parallel to said shaft, and a locking plate mounted in fixed position on said body and having a plurality of apertures each of which is adapted to receive the selector pin for a different angular setting of said shaft, whereby the oscillating range of said vanes can be shifted by sliding the shaft along said body in one direction to disconnect said pin from said locking plate to permit rotation of said shaft and then sliding the shaft in an opposite direction to move the pin into engagement with said plate after the adjustment has been made.

5. A spraying machine for tall vegetation such as trees comprising a generally cylindrical housing, means for mounting said housing with the axis thereof horizontal, means for forming an air blast in said housing, means providing a lateral air discharge opening in said housing, an air guiding conduit extending around said opening and projecting upwardly from said housing, said conduit terminating in an upper, relatively narrow transverse discharge mouth lying in a generally horizontal plane, a vertically elongated, rigid air discharge conduit, said discharge conduit having an inlet mouth for communication with the discharge mouth of said air guiding conduit, said discharge conduit having an inlet mouth for communication with the discharge mouth of said air guiding conduit, said discharge conduit having an air discharge outlet adjacent one end thereof, means for delivering spraying material to said discharge outlet, means mounting said discharge conduit on said air guiding conduit for pivoting about a horizontal pivot axis along one transverse side of the mouths of both conduits, means for holding said discharge conduit in an upright spraying position with the mouths of said conduits in communication, means for supporting said discharge conduit in a lowered position adjacent said cylindrical housing, and air guide vanes in the discharge outlet of said discharge conduit.

6. A spraying machine for tall vegetation such as tress comprising a generally cylindrical housing, means for mounting said housing with the axis thereof horizontal, means for forming an air blast in said housing, means providing lateral air discharge openings in opposite sides of said housing, an air guiding conduit extending around one of said openings and projecting upwardly from said housing, the other of said discharge openings being open to direct air laterally from said housing, a vertically elongated, rigid air discharge tower extending upwardly from said air guiding conduit, said discharge tower having an air discharge outlet along one side thereof inclined at an acute angle to the vertical, a spray nozzle manifold at said tower discharge outlet, a set of air guide vanes mounted in said other air discharge opening in said housing for pivotal motion about a vertical axis, a set of air guide vanes mounted in the discharge outlet of said tower for pivotal motion about a horizontal axis, and means for simultaneoulsy oscillating both sets of vanes.

7. A spraying machine for tall vagetation such as trees comprising a generally cylindrical housing, means for mounting said housing with the axis thereof horizontal, means for forming an air blast in said housing, means providing an air discharge opening in said housing, an air guiding conduit extending around said opening and projecting upwardly from said housing, a vertically elongated, rigid air discharge tower extending upwardly from said air guiding conduit, said tower extending a distance above said housing that is approximately equal to twice the diameter of the housing, said discharge tower having an air discharge outlet along one side thereof inclined at an acute angle to the vertical, a spray nozzle manifold at said tower discharge outlet, a set of air guide vanes mounted in the discharge outlet of said tower for pivotal motion about a horizontal axis, and means for oscillating said vanes.

8. A spraying machine for tall vegetation such as trees comprising a generally cylindrical housing, means for mounting said housing with the axis thereof horizontal, means for forming an air blast in said housing, means providing lateral air discharge openings in opposite sides of said housing, an air guiding conduit extending around one of said openings and projecting upwardly from said housing, the other of said discharge openings being open to direct air laterally from said housing, a vertically elongated, rigid air discharge tower extending upwardly from said air guiding conduit, said discharge tower having an air discharge outlet along one side thereof inclined at an acute angle to the vertical, a spray nozzle manifold at said tower discharge outlet, a set of air guide vanes pivotally mounted about parallel axes in said other air discharge opening in the housing, a set of air guide vanes mounted in the discharge outlet of said tower for pivoting about an axis at 90° to that of the vanes in said other discharge opening, and means for simultaneously oscillating both sets of vanes.

9. A spraying machine for tall vegetation such as trees comprising a generally cylindrical housing, means for mounting said housing with the axis thereof horizontal, means for forming an air blast in said housing, means providing lateral air discharge openings in opposite sides of said housing, an air guiding conduit extending around one of said openings and projecting upwardly from said housing, the other of said discharge openings being open to direct air laterally from said housing, a vertically elongated, rigid air discharge tower extending upwardly from said air guiding conduit, said tower having a first discharge portion extending along one side thereof, said first discharge portion being inclined at an acute angle to the vertical, said tower having a second discharge portion forming a continuation of said first discharge portion, said second discharge portion being substantially shorter than said first discharge portion, said second discharge portion being inclined at an acute angle to the horizontal, a spray nozzle manifold at said tower discharge portions, a set of air guide vanes mounted in said other side of the air discharge opening in said housing for pivotal motion about a vertical axis, a set of air guide vanes mounted in the first discharge portion of said tower for pivotal motion about a horizontal axis, and means for simultaneously oscillating both sets of vanes.

References Cited in the file of this patent

UNITED STATES PATENTS

| | | |
|---|---|---|
| 613,260 | Felsing | Nov. 1, 1898 |
| 1,049,178 | Vraalstad | Dec. 31, 1912 |
| 2,643,155 | Wright | June 23, 1953 |
| 2,668,082 | Pasteur | Feb. 2, 1954 |
| 2,738,226 | Bals | Mar. 13, 1956 |
| 2,807,120 | Graham | Sept. 24, 1957 |
| 2,925,222 | Spreng | Feb. 16, 1960 |

FOREIGN PATENTS

| | | |
|---|---|---|
| 473,335 | Italy | July 23, 1952 |
| 588,592 | Great Britain | May 28, 1947 |
| 1,232,915 | France | May 2, 1960 |